(12) United States Patent
Xu et al.

(10) Patent No.: US 10,375,371 B2
(45) Date of Patent: Aug. 6, 2019

(54) METHOD AND APPARATUS FOR FILTERING 360-DEGREE VIDEO BOUNDARIES

(71) Applicant: MediaTek Inc., Hsinchu (TW)

(72) Inventors: Xiaozhong Xu, State College, PA (US); Shan Liu, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 68 days.

(21) Appl. No.: 15/647,630

(22) Filed: Jul. 12, 2017

(65) Prior Publication Data

US 2018/0020202 A1 Jan. 18, 2018

Related U.S. Application Data

(60) Provisional application No. 62/384,768, filed on Sep. 8, 2016, provisional application No. 62/362,613, filed on Jul. 15, 2016.

(51) Int. Cl.

| | |
|---|---|
| H04N 7/12 | (2006.01) |
| H04N 11/02 | (2006.01) |
| H04N 11/04 | (2006.01) |
| H04N 13/106 | (2018.01) |
| H04N 13/161 | (2018.01) |
| H04N 19/117 | (2014.01) |
| H04N 19/167 | (2014.01) |
| H04N 19/46 | (2014.01) |
| H04N 19/86 | (2014.01) |
| G06T 3/00 | (2006.01) |
| H04N 19/136 | (2014.01) |
| H04N 19/182 | (2014.01) |
| H04N 19/423 | (2014.01) |

(52) U.S. Cl.
CPC ......... *H04N 13/106* (2018.05); *G06T 3/0025* (2013.01); *H04N 13/161* (2018.05); *H04N 19/117* (2014.11); *H04N 19/136* (2014.11); *H04N 19/167* (2014.11); *H04N 19/182* (2014.11); *H04N 19/46* (2014.11); *H04N 19/86* (2014.11); *H04N 19/423* (2014.11)

(58) Field of Classification Search
None
See application file for complete search history.

(56) References Cited

U.S. PATENT DOCUMENTS

| | | | |
|---|---|---|---|
| 2015/0187135 A1* | 7/2015 | Magder | G06T 17/20 345/420 |
| 2015/0341552 A1* | 11/2015 | Chen | H04N 5/23238 348/38 |

FOREIGN PATENT DOCUMENTS

CN 102970529 B 2/2016

OTHER PUBLICATIONS

Taiwan Intellectual Property Office, Office Action for Taiwan Patent Application No. 106123460, dated Jul. 16, 2018.

* cited by examiner

*Primary Examiner* — Talha M Nawaz
(74) *Attorney, Agent, or Firm* — Han IP PLLC; Andy M. Han

(57) ABSTRACT

A video system for encoding or decoding 360-degree virtual reality (360VR) video is provided. The system performs filtering operations to reduce coding artifacts and discontinuities in a projection image of an omnidirectional image. The video system identifies first and second edges of the projection image. The first and second edges are physically correlated as a common edge in the omnidirectional image but not physically connected in the projection image. The system computes a set of filtered pixels based on a first set of pixels near the first edge and a second set of pixels near the second edge.

17 Claims, 13 Drawing Sheets

| Projections | 3D Model | 2D Projection | Vertexes | Area Ratio vs. Sphere | Area Ratio vs. ERP |
|---|---|---|---|---|---|
| Tetrahedron (4 faces) | | | 4 | 3.31x | 2.11x |
| Cube (6 faces) | | | 8 | 1.91x | 1.22x |
| Octahedron (8 faces) | | | 6 | 1.65x | 1.05x |
| Dodecahedron (12 faces) | | | 20 | 1.32x | 0.84x |
| Icosahedron (20 faces) | | | 12 | 1.21x | 0.77x |

*Figure 2*

METHOD AND APPARATUS FOR FILTERING 360-DEGREE VIDEO BOUNDARIES

CROSS REFERENCE TO RELATED PATENT APPLICATIONS

The present disclosure claims the priority benefit of U.S. Patent Application No. 62/362,613, filed 15 Jul. 2016, and U.S. Patent Application. No. 62/384,768, filed 8 Sep. 2016. Contents of the aforementioned applications are incorporated by reference in their entirety.

TECHNICAL FIELD

The present disclosure relates generally to video processing. In particular, the present disclosure relates to methods for filtering images for 360-degree virtual reality (360VR) video presentation.

BACKGROUND

Unless otherwise indicated herein, approaches described in this section are not prior art to the claims listed below and are not admitted as prior art by inclusion in this section.

360-degree virtual reality (360VR) is an audiovisual simulation of an altered, augmented, or substituted environment. The visual reality video surrounds the user, allowing the user to look around in any direction or at any arbitrary view angle, just as he or she can in real life. 360VR videos produce exceptional high-quality and high-resolution panoramic videos for use in print and panoramic virtual tour production for a variety of applications, such as entertainment, pilot training, surgery, and exploration in space or deep water.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the present disclosure provide a video system for encoding or decoding 360-degree virtual reality (360VR) video. The system performs filtering operations to reduce coding artifacts and discontinuities in a projection image of an omnidirectional image. The video system identifies first and second edges of the projection image. The first and second edges are physically correlated as a common edge in the omnidirectional image but not physically connected in the projection image. The system then computes a set of filtered pixels based on a first set of pixels near the first edge and a second set of pixels near the second edge.

In some embodiments, the omnidirectional image is a cube having a plurality of faces and the projection image comprises a layout of the faces of the cube. The first edge is an edge of a first face of the cube, the second edge is an edge of a second face of the cube, the first set of pixels is in the first face of the cube, and the second set of pixels is in the second face of the cube. As part of its filtering operation, the video system rearrange pixels of the second face of the cube according to a geographical relationship between the first face and the second face. The geographical relationship is defined by the layout of the faces of the cube in the projection image. The rearrangement of pixels of the second face may include rotating or flipping pixels of the second face based on the geographical relationship between the first face and the second face. In some embodiments, the rearranged pixels of the second face are stored in a blank area of the projection image adjacent to the first edge. In some embodiments, the rearranged pixels of the second face are stored in a temporary buffer that does not store pixels of a blank area of the projection image. The video system computes a set of filtered values for the first and second sets of pixels based on the pixels of the first face and the rearranged pixels of the second face.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIG. 2 lists and illustrates several different types of platonic solids and their corresponding 2D projections.

DETAILED DESCRIPTION

Figure 1:
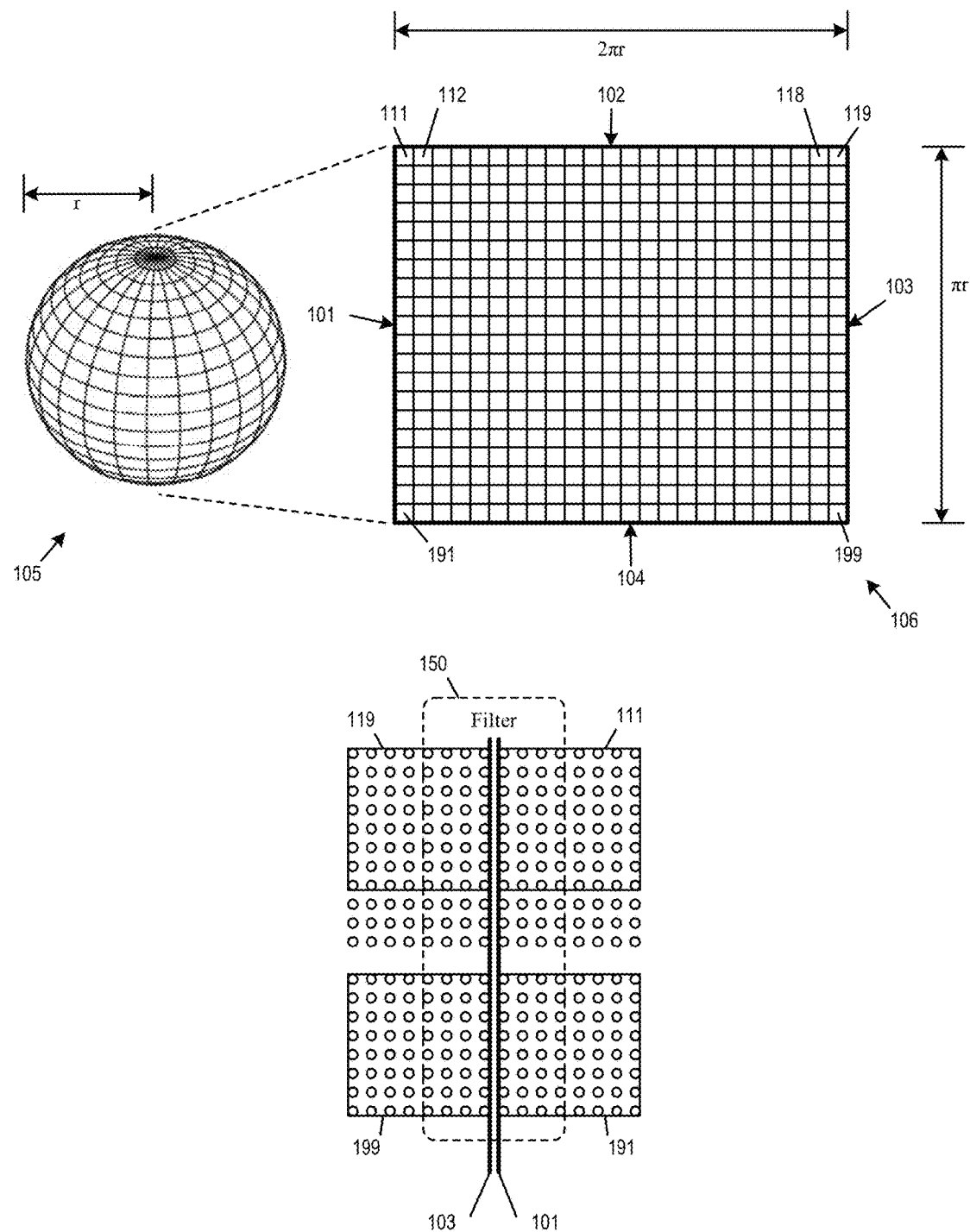
FIG. 1 conceptually illustrates the filtering of discontinuities in a projected image of an omnidirectional image.

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

360-degree virtual reality (360VR) experiences are generally based on videos of two-dimensional (2D) images that are projections of omnidirectional images. Geometrically, an omnidirectional image takes the form of the inner surface of a three-dimensional (3D) object that surrounds the viewer. A projection image is the projection of the omnidirectional image onto a flat surface.

There are many ways of projecting an omnidirectional image onto a flat surface. The most common is equirectangular projection, which projects a spherical omnidirectional image onto a flat surface. (This is similar to cartography for describing earth surface in a rectangular format on a plane.) This type of projection is a simple transformation process that results in different amount of distortions at different latitudes of the sphere. Specifically, the projection has minimal distortions or is free of distortions near the equator of the sphere while suffering maximal distortions with maximum stretching near the poles of the sphere.

A spherical omnidirectional image theoretically has no borders or edges and hence no discontinuities. When a spherical omnidirectional image is projected onto a 2D flat surface (by e.g., equirectangular projection), the unfolding of omnidirectional splits the image and creates borders (or picture boundaries) and hence discontinuities at the borders of the image. (Each border of the projected image is also an edge of the image.)

A spherical omnidirectional image projected onto the surface of a platonic solid has discontinuities between the different faces of the platonic solid along the edges of each face. When the platonic solid omnidirectional image is projected onto a 2D flat surface, the unfolding of the image creates further discontinuities as at least some of the faces of the platonic solid become detached from each other.

Some embodiments of the disclosure provide a video system which performs a method for filtering the discontinuities and/or encoding artifacts along the edges and/or borders of a 2D image that is a projection of an omnidirectional image of a 360VR video. The video system receives the projection image of the omnidirectional image. The video system identifies first and second edges of the projection image. The first and second edges are physically correlated as a common edge in the omnidirectional image but not physically connected in the projection image. The video system then computes a set of filtered pixels based on a first set of pixels near the first edge and a second set of pixels near the second edge. (Pixels "near" an edge may include N columns or N rows of pixels closest to the edge).

FIG. 1 conceptually illustrates the filtering of discontinuities in a projected image of an omnidirectional image. Specifically, the figure illustrates a spherical omnidirectional image 105 (with radius r) that is projected into a 2D flat image 106 by equirectangular projection (with width of 2πr and height πr).

The projected image 106 is a rectangular image having borders 101-104. The border 102 is a projection of the north pole of the sphere 105 while the border 104 is a projection of the south pole of the sphere 105. The borders 101 and 103 correspond to the splitting/unfolding of the sphere 105 along one longitudinal line (i.e., a common edge) of the sphere 105. In other words, the borders 101 and 103 are edges of the projected image 106 that extend from the north pole to the south pole of the sphere 105.

The region of the projected image 106 along the border 101 is not physically connected with the region of the projected image along the border 103. However, the region of the projected image 106 along the border 101 is physically correlated with the portion of the projected image along the border 103, as they correspond to physically connected regions of the original spherical omnidirectional image 105.

In some embodiments, the video system performs filtering operations to improve visual quality and prediction performance. The filtering operations smooth out the artifacts that can form between pixel blocks (e.g., macroblock, coding block, or coding units) when the video images are encoded and decoded block by block. As illustrated, the projected image 106 is divided into pixel blocks for coding (e.g., blocks 111-119, 191-199). Deblock filtering reduces discontinuity artifacts between any two adjacent pixel blocks (e.g., 111 and 112) by computing a set of filtered pixels based on pixel values of the two adjacent pixel blocks (by e.g., averaging the pixel values of both blocks).

For the projected image 106, the video system not only apply filtering between adjacent pixel blocks, but also between pixel blocks across borders that are physically connected in the omnidirectional image 105 at a common edge (or common line) but not physically connected in the projection image 106.

As illustrated, the block 119 is situated along the border 103 (the right border) of the projected image 106, while the block 111 is situated along the border 101 (the left border). The blocks 111 and 119 share a common edge in the original omnidirectional sphere 105 along the longitude line that is projected as both borders 101 and 103. The pixels of the block 119 and of the block 111 are therefore physically correlated though not physically connected in the projected image 106.

The video system identifies the borders 101 and 103 as a common edge and applies filtering between the pixel block 119 and 111 across the common edge as if they are adjacent blocks. The video system also applies filtering to other pixel blocks along the borders 101 and 103, including the pixel block 199 and 191. As illustrated, the filtering is applied to pixels that fall within a range 150, which includes one or more columns of pixels along the border 101 and the border 103. The set of pixels included in the filtering range 150 is determined by the specification of the filter.

FIG. 1 illustrates filtering of pixel blocks along the borders of an equirectangular projection image of a spherical omnidirectional image. In some embodiments, an omnidirectional image can also be projected onto a platonic solid, such as cube (6 faces), tetrahedron (4 faces), octahedron (8 faces), dodecahedron (12 faces), or icosahedron (20 faces). Unlike a sphere, whose only face is non-flat that result in distorted projection, a platonic solid has flat faces that can be projected onto a flat plane (2D projection) by simple unfolding without further distortion. FIG. 2 lists and illustrates several different types of platonic solids and their corresponding 2D projections. The figure also includes their area ratio compared to a spherical projection and an equirectangular projection (ERP).

In some embodiments, a video system that uses platonic solid projection applies filtering for pixels along edges of each face of the platonic solid as well as along the unfolded borders. The video system identifies edges or borders of platonic solid faces that share a common edge in the omnidirectional image but are physically disconnected in the projection image. The pixels along the identified edges are filtered together by the video system.

In some embodiments, the omnidirectional image is a platonic solid and the projection image comprises a layout of the faces of the platonic solid. The video system identifies first and second edges of the projection image. The first and second edges are physically correlated as a common edge in the omnidirectional image but not physically connected in the projection image. The first edge is an edge of a first face of the platonic solid, the second edge is an edge of a second face of the platonic solid, the first set of pixels is in the first face of the platonic solid, and the second set of pixels is in the second face of the solid. The system then computes a set of filtered pixels based on a first set of pixels near the first edge and a second set of pixels near the second edge.

For illustrative simplicity, FIGS. 3-8 below use a cube having six faces as an example of a platonic solid omnidirectional image. One of ordinary skill would understand that the disclosed method and/or system of common edge identification and filtering applies to other types of platonic solids as well (i.e., tetrahedron, cube, octahedron, dodecahedron, icosahedron, etc.).

Figure 3:
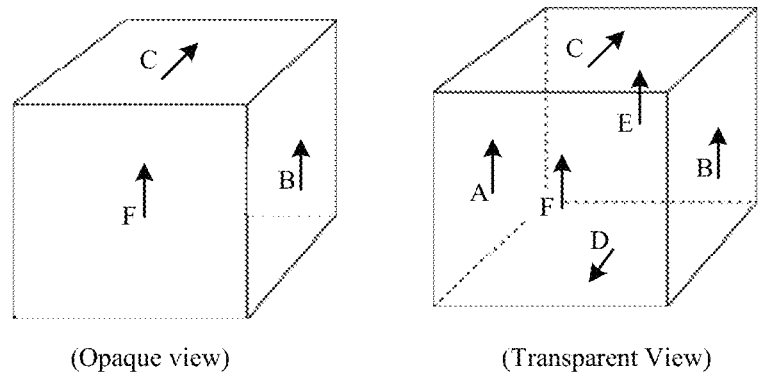
FIG. 3 illustrates the projection of an omnidirectional image in cubic format into a 2D projection image.
Figure 3:
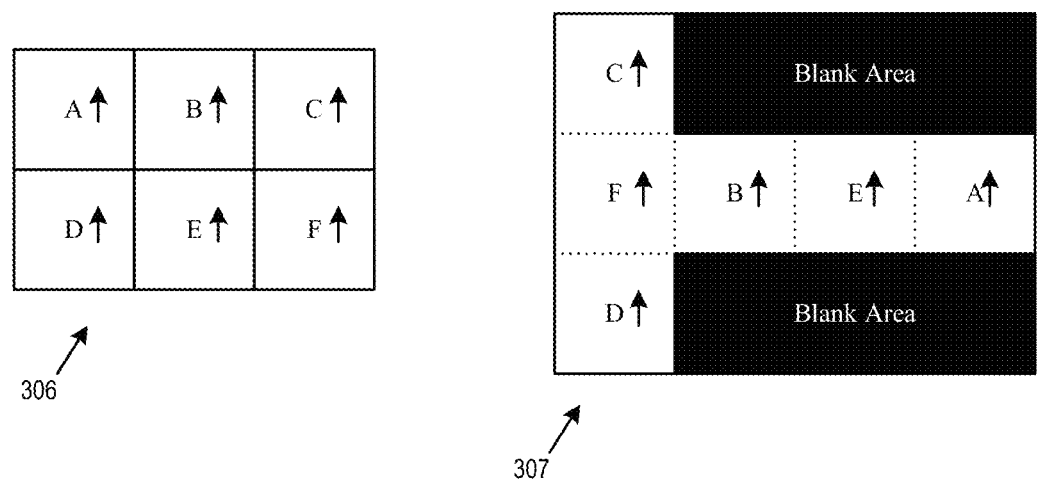

FIG. 3 illustrates the projection of a cubic omnidirectional image 305 into 2D projection images. The cube 305 has six faces A, B, C, D, E, and F. F face is in front; A face is to the left; C face is on top; E face is at the rear (or from behind); D face is at the bottom; B face is to the right.

In order to encode the cubic omnidirectional image according to a video codec conforming format as part of a 360VR video, the cube is projected onto a flat 2D projection image where the six faces of the cube are arranged in a 2-D rectangular shape plane. Different arrangements of the six faces can be made when projecting the cube 305 onto a flat 2D projection.

The six faces can be arranged in a 3×2 cubic format in a 3×2 shaped rectangular plane 306, wherein the faces of the cube fill the rectangular plane without regard to their geometric relationship with each other in the cube 305. As illustrated, the top row of the 3×2 rectangular plane includes faces A, B, and C, while the second row of the 3×2 rectangular plane includes faces D, E, and F. There may be other ordering arrangements of these six faces into the 3×2 shaped plane.

The omnidirectional image of the cube 305 can also be projected onto a flat 2D projection image by being unfolded from the cube 305 and into a 4×3 shaped plane 307. Faces C, F, and D are physically connected in the vertical direction as they were on the cube 305 (C and F share one common edge; F and D share one common edge). Faces F, B, E, and A are physically connected in horizontal direction as they were on the cube 305 (F and B share one common edge; B and E share one common edge; E and A share one common edge). The remainder of the 4×3 plane is filled with blank areas empty of data. They can be filled with default values such as black pixels. After decoding the 4×3 cubic plane image 307, pixels in the corresponding faces are used to reconstruct the data in the original cube; pixels not in the corresponding faces (e.g. those filled with black pixel values) are discarded, or left in the image for future reference purpose.

Two physically connected faces in the 4×3 cubic plane image 307 have pixels that are highly physically correlated because they are also physically connected in the cube 305 and share common edges. However, not all physically connected faces in the cube 305 are allocated next to each other and share common edges in the 4×3 cubic plane image 307. In some embodiments, the video system identifies cube faces in the projected image 307 that share common edges in the omnidirectional image 305. Specifically, for each edge of each face in the 4×3 cubic plane image 307, the video system identifies a corresponding edge of another face that share a common edge in the cube 305, regardless of whether the two faces are physically connected in the 4×3 cubic plane image 307.

Figure 4:
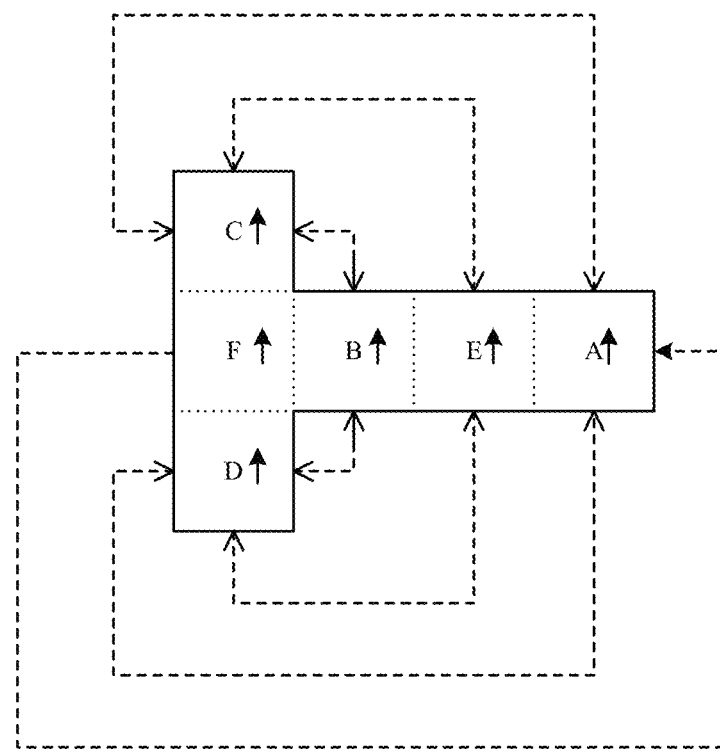
FIG. 4 illustrates the identification of common edges in a 4×3 cubic plane image.

FIG. 4 illustrates the identification of common edges in a 4×3 cubic plane image. As illustrated, within the 4×3 cubic plane image 307, each face is physically connected to at least one other face through a common edge. For example, the face B is physically connected to faces F and E through common edges, and the face F is physically connected to faces C, B, and D through common edges.

Each face also shares at least one common edge with another face in the cube omnidirectional image that it is physically disconnected within the 4×3 cubic plane image. The figure indicates these common edges with dashed arrows. As illustrated, the top edge of face B shares a common edge with the right edge of face C, the top edge of face E shares a common edge with the top edge of face C, the top edge of face A shares a common edge with the left edge of face C, the right edge of face A shares a common edge with the left edge of face F, etc.

As mentioned, the video system performs filtering (e.g., deblocking) to reduce discontinuity and compression artifacts across each identified common edge. The video system filters the pixels in the two faces near the common edge so that after decoding, when the omnidirectional image is reconstructed as a cube, there is no discontinuity or apparent compression artifact across the edge. In some embodiments, the filtering operation performed includes sample adaptive offset (SAO). In some embodiment, the filtering operations include adaptive loop filter (ALF).

Considering that the data on the cube (or other platonic solid) will be projected (mapped) into other formats, and eventually displayed using other formats (such as spherical format), the video system in some embodiments performs filtering operations based on the eventually displayed format of the omnidirectional image (rather than the cubic format). The edge on the cube (or other platonic solid) may not be a straight line after projection, but still can be recognized as the positions of edges are fixed. Because of potential distortion introduced by the projection, the filtering operations on the projected format may no longer be vertical/horizontal oriented, and may be asymmetrical.

Since not all physically connected faces of the cube 305 are placed adjacent in the 4×3 cubic plane image 307, the deblock filtering of pixels across some of the edges in the projected image 307 would fail for not having the correct pixels from the two adjacent faces. For example, the top edge of the face B should be connected to the right edge of face C, and the bottom edge of face B should be connected to the right edge of face D. However, in the 4×3 cubic plane image 307, these two edges are connected to blank areas (with some default values set). Applying filters across these edges may result in undesirable filtering effect. As another example, the right edge of face A should be connected to the left edge of face F. However, in the 4×3 cubic plane image 307, these two edges become picture boundaries.

In some embodiments, when performing filtering at a common edge between a first face of the cube and a second face of the cube that are not physically connected in the projection image, the video system rearranges pixels of the second face of the cube according to a geographical relationship between the first face and the second face. The geographical relationship is defined by the layout of the faces of the cube in the projection image (e.g., the 4×3 cubic plane image 307).

Figure 5:
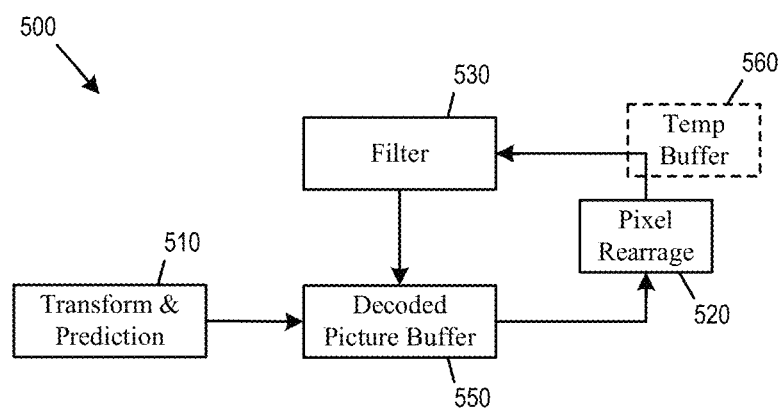
FIG. 5 illustrates a 360VR video system that performs filtering operations for a projection image of an omnidirectional image.

FIG. 5 illustrates a 360VR video system 500 that performs filtering operations for a projection image of an omnidirectional image. The video system 500 includes a transform and prediction process 510, a pixel rearranging process 520, a filtering process 530, and a decoded picture buffer 550. In some embodiments, the processes 510, 520, and 530 are performed by corresponding modules of software instructions being executed by one or more processing units (e.g., a processor) of a computing device implementing the video system 500. In some embodiments, the processes 510, 520, and 530 are performed by modules of hardware circuits implemented by one or more integrated circuits (ICs) of an electronic apparatus implementing the video system 500. For example, in some embodiments, the transform and prediction process 510 is performed by a transform and prediction circuit, the pixel rearranging process 520 is performed by a pixel rearranging circuit, and the filtering process 530 is performed by a filtering circuit.

The transform and prediction process 510 produces the 4×3 cubic plane image 307 as a decoded video frame for a 360VR video (as part of a video encoding process or video decoding process according to a video codec format). The pixels of the cubic plane image 307 are stored in the decoded picture buffer 550 of the video system such that the filtering process 530 can perform filtering across edges of the different faces by retrieving or accessing the pixels stored in the decoded picture buffer 550. The pixel rearranging process 520 rearranges (rotate, flip, etc.) the retrieved pixels according to the geographical relationships between the faces in the 4×3 cubic plane image as described by reference to FIG. 4.

In some embodiments, the rearranged pixels are stored in the decoded picture buffer 550 for access by the filtering process 530. In some embodiments, the rearranged pixels are stored in a temporary buffer 560 separate from the decoded picture buffer 550 for access by the filtering process 530. In some embodiments, the system rearranges the pixels of a face by storing pixels in their corresponding rearranged positions. In some embodiments, the system does not store the pixels in their rearranged positions, but instead uses a mapping table to simulate such a rearrangement. Namely, when performing filtering across a common edge with another face, the system retrieves pixels of the face in a sequence according to the mapping table.

Figure 6A:
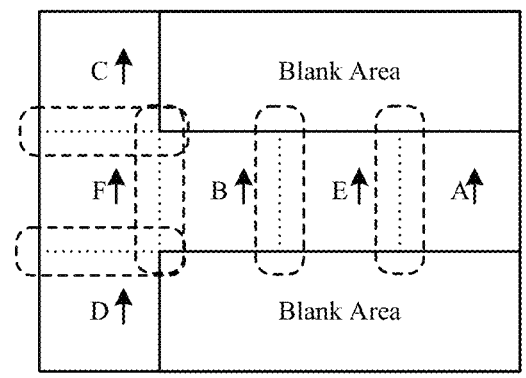
FIG. 6a conceptually illustrates the filtering across edges between faces that are physically connected in the 4×3 cubic plane image.

FIG. 6a conceptually illustrates the filtering across edges between faces that are physically connected in the 4×3 cubic plane image 307 (as well as in the cube 305). Filtering takes place across common edges between physically connected faces without any pixel rearrangements. These common edges include: the bottom of C and the top of F; the bottom of F and the top of D; the right of F and left of B; the right of B and the left of E; the right of E and the left of A.

Figure 6B:
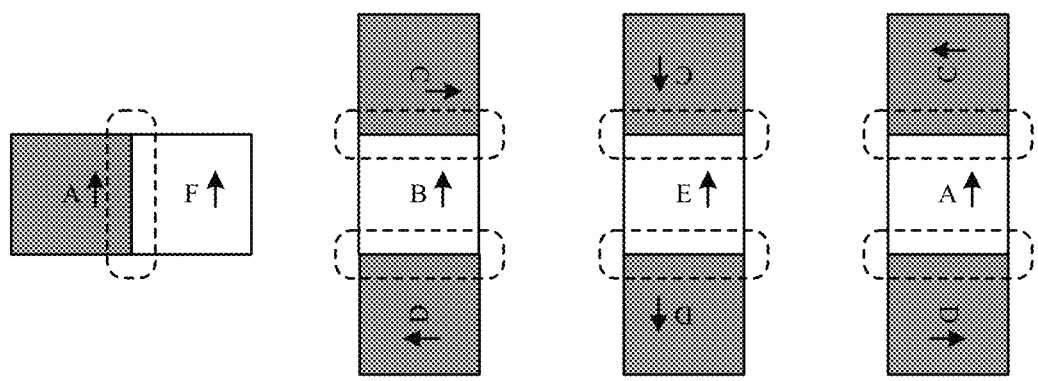
FIG. 6b illustrates the filtering across edges between faces that are not physically connected in the 4×3 cubic plane image.

FIG. 6b illustrates the filtering across edges between faces that are not physically connected in the 4×3 cubic plane image 307. These are common edges between physically connected faces in the cube 305. In the 4×3 cubic plane image 307, the faces sharing these common edges are physically correlated but not physically connected.

To filter the pixels of a given face near such an edge, the video system identifies (at e.g., the filtering process 530) the corresponding face that shares the edge as a common edge in the cube 305 but not in the 4×3 cubic plane image 307. The video system then retrieves the pixels from the given face and the identified corresponding face for filtering across the common edge. For example, to filter the pixels near the left edge of face F, the video system identifies the right edge of face A as the common edge and retrieves the pixels of face A for filtering.

The identified corresponding face may not necessarily be at a correct orientation relative to the given face. In these instances, the video system would rotate, flip, transpose, or otherwise rearrange the pixels of the identified corresponding face in order for pixels from the two faces to align for filtering. The rearrangement of pixels (or re-orientation) of the corresponding face is based on the geographical relationship between the two faces as defined by the layout of the faces in the 4×3 cubic plane image 307.

For example, the top of face B is a common edge with the right of face C, so the video system rotates the pixels of face C by 90 degrees. The video system then performs filtering across the common edge (top of B and right of C) based on the rotated pixels. As another example, the bottom of face E is a common edge with the bottom of face D, so the video system rotates the pixels of face D by 180 degrees. The video system then performs filtering across the common edge (bottom of D and bottom of E) based on the rotated pixels.

In some embodiments, the video system stores rotated or re-arranged versions of a face in the blank areas of the projection image. This allows pixels that are to be filtered together to be stored in adjacent areas of the 4×3 cubic plane image in the decoded picture buffer 550 so that the filtering process 530 can access the pixels together for filtering.

Figure 7:
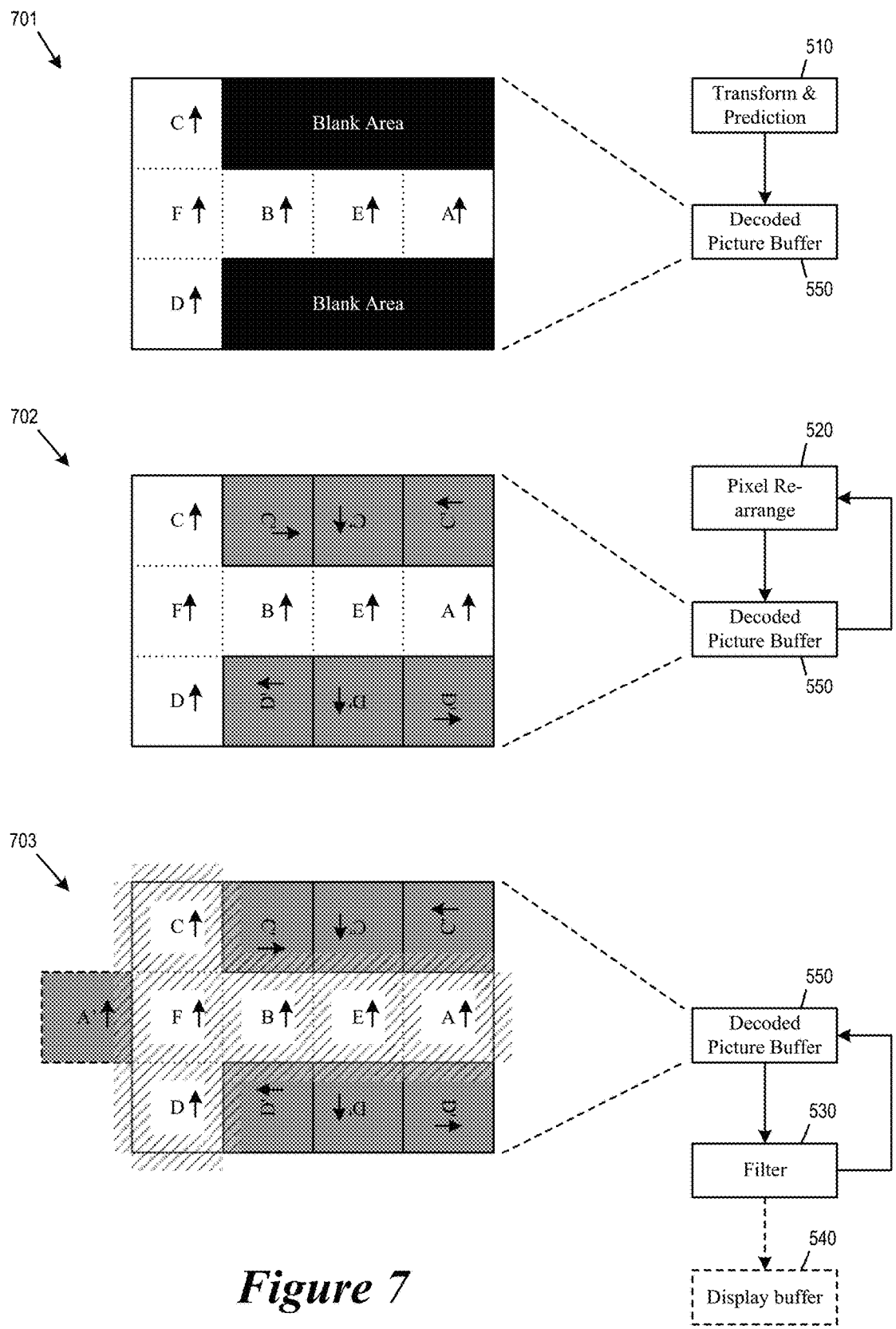
FIG. 7 illustrates storing rotated or rearranged versions of a face in the blank areas to facilitate filtering across edges of faces in a 4×3 cubic plane image.

FIG. 7 illustrates storing rotated or rearranged versions of faces in the blank areas of the 4×3 cubic plane image 307 to facilitate filtering across edges of faces. The figure illustrates such filtering operations in three stages 701-703.

At the first stage 701, the transform and prediction process 510 produces the 4×3 cubic plane image 307 as a decoded video frame for a 360VR video. The pixels of the decoded video frame are stored in the decoded picture buffer 550. The stored 4×3 cubic plane image 307 initially includes blank areas (that may be filled with default values).

At the second stage 702, a projection image rearrangement process 520 retrieves pixels of certain faces in the 4×3 cubic plane image 307, rearranges the retrieved pixels (rotate, flip, etc.) and store the rearranged pixels back to the decoded picture buffer 550 at blank areas of the 4×3 cubic plane image 307.

As illustrated, the pixels of face C are rotated 90 degrees and stored in the blank area adjacent to the top edge of face B, rotated 180 degrees and stored in the blank area adjacent to the top edge of face E, and rotated 270 degrees and stored in the blank area adjacent to the top edge of face A. (The rotated versions of face C are labeled C'). The pixels of face D are rotated 270 degrees and stored in the blank area adjacent to the bottom edge of face B, rotated 180 degrees and stored in the blank area adjacent to the bottom edge of face D, and rotated 90 degrees and stored in the blank area adjacent to the bottom edge of face A. (The rotated versions of face D are labeled D').

In some embodiments, the entirety of face C is rotated and stored in the blank area along the top edges of faces B, E, and A, and the entirety of face D is rotated and stored in the blank area along the bottom edges of faces B, E, and A. In some embodiments, only a subset of the pixels of face C and D are stored in the blank area (e.g., only the pixels that are needed for filtering). In some embodiments, the video system retrieves the pixels of face A and stores them in a memory region adjacent to the left edge of face F in order to facilitate the filtering across their common edge. In some embodiments, the pixels of face A are used directly for filtering its common edge with face F being stored in another memory storage since pixels of face A is already in the correct orientation with respect to face F.

At the third stage 703, a filtering process 530 process performs filtering across each common edge by simply retrieving pixels at both sides of the edge from the decoded picture buffer 550 as the blank areas are now populated with re-arranged pixels at their correct positions relative to the common edges. The filtering process computes or generates filtered pixels based on the retrieved pixels and stores the filtered pixels back to the decoded picture buffer 550 (and/or to a separate display buffer 540). In the figure, the regions of the 4×3 cubic plane image 307 having filtered pixels may include at least some of the portions illustrated with hash lines.

The face being retrieved and rearranged according to its geographical relationship to a target face in the 4×3 cubic plane image 307 is referred to as a reference face. The video system performs filtering by computing filtered pixel values based on a set of pixels from the target face and a set of rearranged pixels from the reference face. In the example of FIGS. 6*a-b* and 5, face C, D, and A were used as reference face for filtering with their common edges with target faces B, E, A, and F. The reference face C was retrieved, rotated, and have its pixels in its rotated positions adjusted or filtered in order to perform filtering across its common edges with faces B, E, and A. The reference face D was also retrieved, rotated, and have its pixels in its rotated positions adjusted or filtered in order to perform filtering across its common edges with faces B, E, and A. The reference face A was retrieved (without rotation) and has its pixels adjusted or filtered in order to perform filtering across its common edges with face F.

In some embodiments, after filtering, if the pixels in a reference face have been adjusted due to filtering, these adjusted pixels are processed back to replace the corresponding original pixels in the 4×3 cubic plane image. For example, as pixels in face B are filtered according to the input from both C' and B, and from both B and D', some pixels in face C' and D' are also adjusted as a result of filtering. The video system then uses these adjusted pixels in face C' and face D' to replace their original pixels in face C and D in the 4×3 cubic plane image 307.

Figure 8:
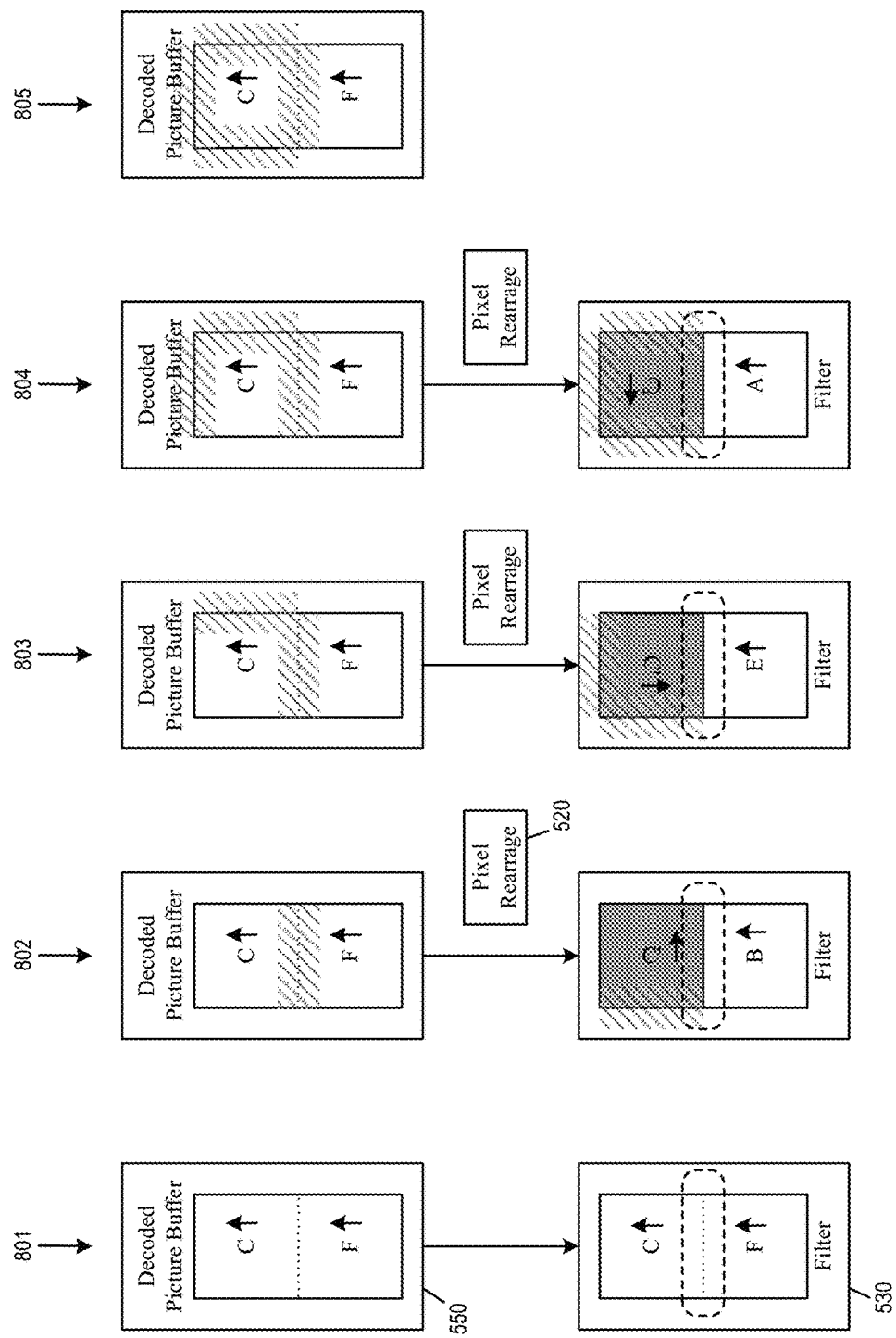
FIG. 8 illustrates the filtering of the projection image based on the rearranged faces.

FIG. 8 illustrates the filtering of the projection image based on the rearranged faces. The figure shows the filtering of faces F, B, E, and A at their common edges with face C' (the rotated versions of face C). The figure also shows the adjusted pixels of face C' replacing the original pixels of face C in the 4×3 cubic plane image. The figure conceptually illustrates the operation of the filtering process 530 and the content of the decoded picture buffer 550 in five stages 801-805.

At first stage 801, the pixels of face C and F stored in the decoded picture buffer 550 are original pixels that have yet to be filtered. The pixels of face C and F are retrieved and filtered by the filtering process 500 such that the pixels near the common edge of faces C and F (bottom of C and top of F) are adjusted for smoothing out coding artifacts.

At the second stage 802, the adjusted pixels of faces C and F near their common edge are stored back to the decoded picture buffer 550 (illustrated by hashed region). The pixels of face C are then retrieved (with adjusted pixels), rotated 90 degrees by the pixel rearranging process 520 so that the common edge shared by face C and B (right of C and top of B) are aligned. The pixels of face C' in their rotated position are made available to the filtering process 530 (in blank area of the 4×3 cubic plane image, in the temporary buffer 560, or directly in flight from the rearranging process 520), which adjusts the pixels in face C' and B near their common edge (right of C and top of B) for smoothing out coding artifacts.

At the third stage 803, the adjusted pixels of face C' are rotated back to their original positions and stored back to the decoded picture buffer 550 (illustrated by hashed region; adjusted pixels of face B not illustrated). The pixels of face C (with adjusted pixels) are then retrieved, rotated 180 degrees by the pixel rearranging process 520 so that the common edge shared by face C and E (top of C and top of E) is aligned. The pixels of face C' in their rotated position are made available to the filtering process 530, which adjusts the pixels in face C' and E near their common edge (top of C and top of E) for smoothing out coding artifacts.

At the fourth stage 804, the adjusted pixels of face C' are rotated back to their original positions and stored back to the decoded picture buffer 550 (illustrated by hashed region; adjusted pixels of face E not illustrated). The pixels of face C (with adjusted pixels) are then retrieved, rotated 270 degrees by the pixel rearranging process 520 so that the common edge shared by face C and A (left of C and top of A) is aligned. The pixels of face C' in their rotated position are made available to the filtering process 530, which adjusts the pixels in face C' and A near their common edge (left of C and top of A) for smoothing out coding artifacts.

At the fifth stage 805, the adjusted pixels of face C' are stored back to the decoded picture buffer 550 (illustrated by hashed region; adjusted pixels of face A not illustrated). At this point, the filtering operation has completely adjusted the pixels of face C for smoothing out coding artifacts around its four edges.

Figure 9:
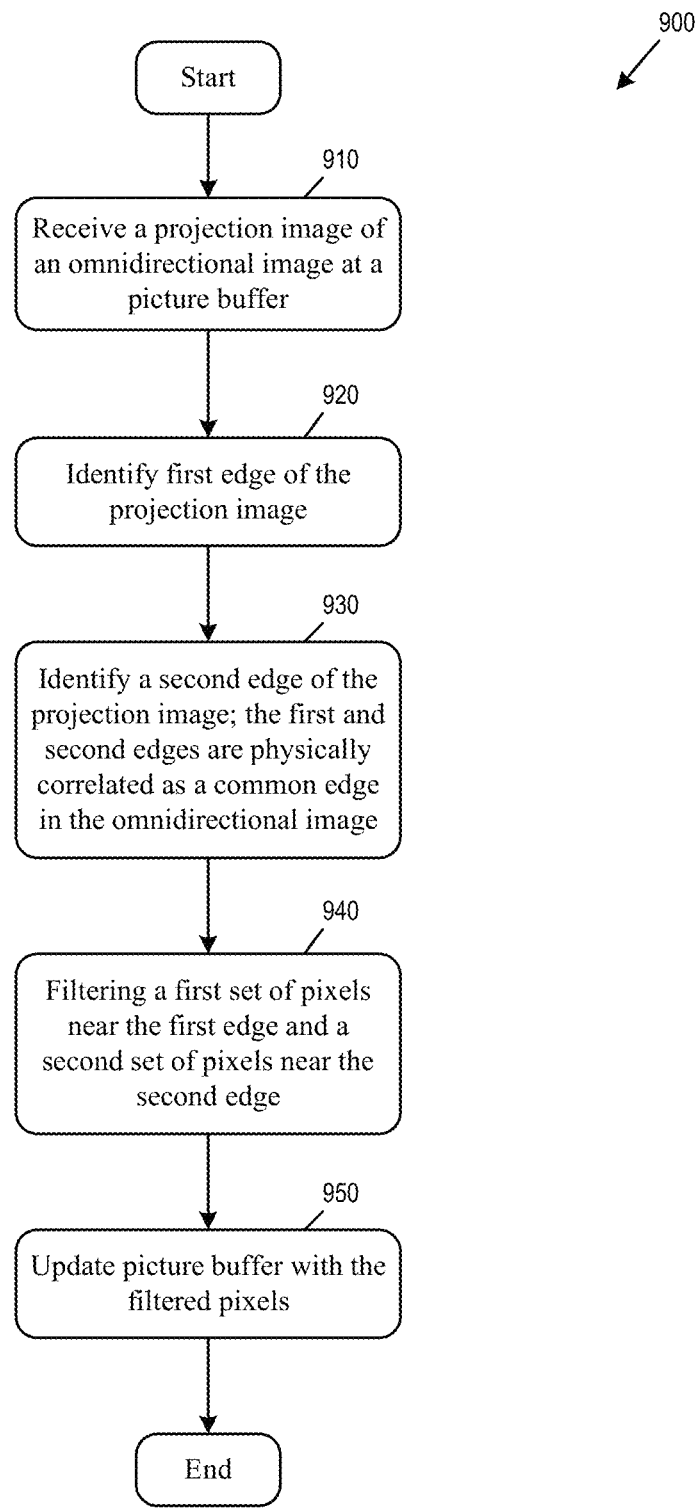
FIG. 9 conceptually illustrates a process for performing filtering to reduce artifact and discontinuities near edges or borders of a projection image of an omnidirectional image.

FIG. 9 conceptually illustrates a process 900 for performing filtering to reduce artifact and discontinuities near edges or borders of a projection image of an omnidirectional image. In some embodiments, one or more processing units (e.g., processor) of a computing device implementing the video system 500 perform the process 900 when encoding or decoding a 360VR video. The omnidirectional image can be the surface of a sphere or of a platonic solid. The projection image can be an equirectangular projection image (such as 106), a 3×2 cubic plane image (such as 136), a 4×3 cubic plane image (such as 307), or any other type of projection image projected from an omnidirectional image.

The process 900 starts when the video system receives (at step 910) a projection image of an omnidirectional image at a picture buffer. The video system then identifies (at step 920) a first edge of the projection image. The video system then identifies (at step 930) a second edge of the projection image. The first and second edges are physically correlated as a common edge in the omnidirectional image. In the example illustrated in FIG. 1, the first and second edges correspond to the borders 101 and 103 of the equirectangular projection image 106. In the example illustrated in FIG. 3, the first and second edge corresponds to edge of faces that are physically correlated but not necessarily physically connected in the projected image, such as the top edge of face B and the right edge of face C.

Figure 10:
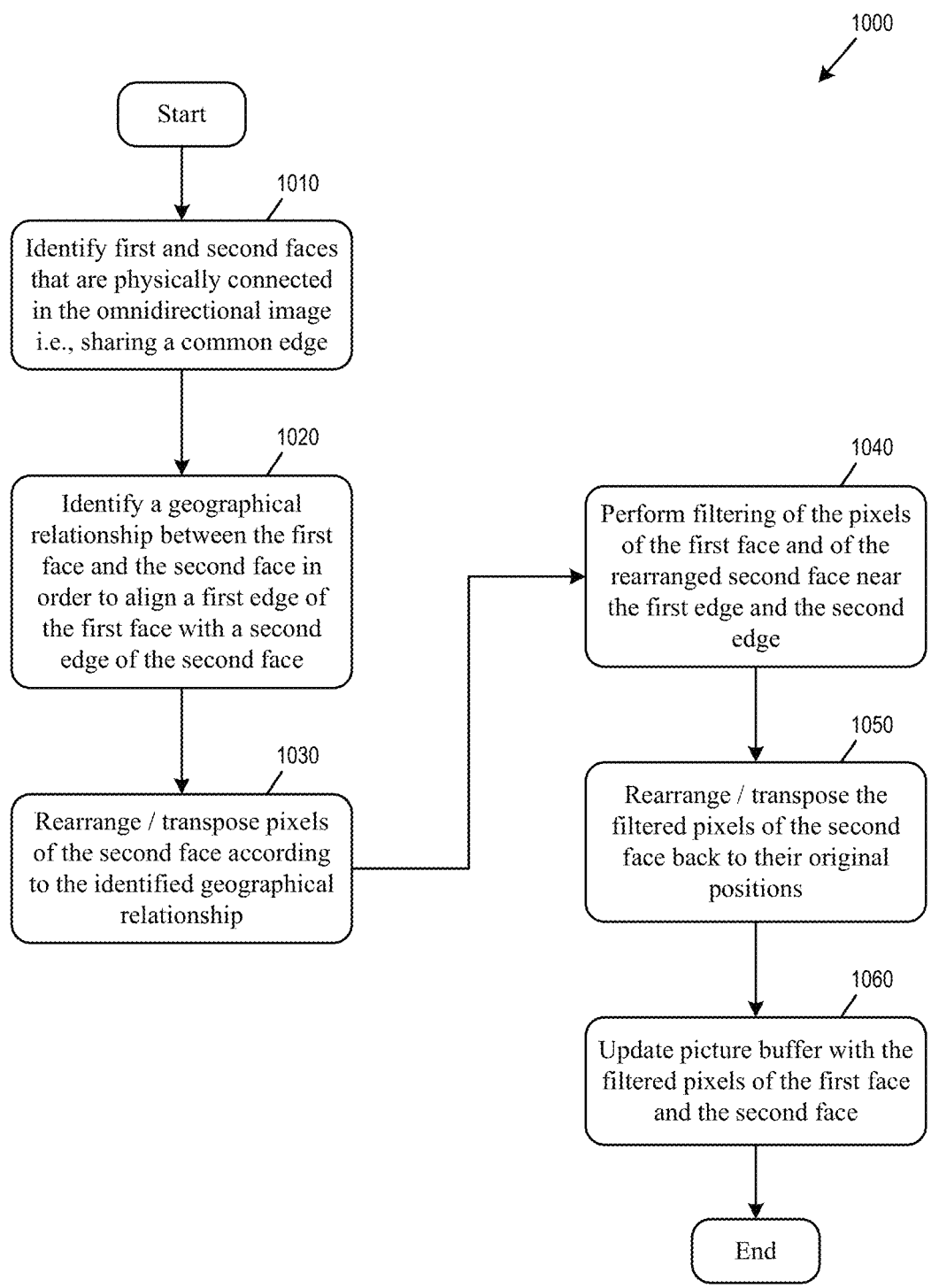
FIG. 10 conceptually illustrates a process for performing filtering to reduce artifact and discontinuities near edges of platonic solid faces in a projection image of a platonic solid omnidirectional image.

The video system then filters (at step 940) a first set of pixels near the first edge and a second set of pixels near the second edge. Specifically, this operation computes a set of filtered or adjusted pixels based on both sets of pixels. The video system then updates (at step 950) the content of the picture buffer to replace the original first set of pixels near the first edge and the original second set of pixels near the second edge. The process 900 then ends FIG. 10 conceptually illustrates a process 1000 for performing filtering to reduce artifact and discontinuities near edges of platonic solid faces in a projection image of a platonic solid omnidirectional image. In some embodiments, one or more processing units (e.g., a processor) of a computing device implementing the video system 500 perform the process 1000 when encoding or decoding a 360VR video. The projection image can be a 3×2 cubic plane image (such as 306), a 4×3 cubic plane image (such as 307), or any other type of projection image projected from an omnidirectional image.

The process starts when the video system identifies (at step 1010) first and second faces that are physically connected in the omnidirectional image (e.g., the first and second faces share a common edge). The video system identifies (at step 1020) a geographical relationship between the first face and the second face in the projection image in order to align a first edge of the first face with a second edge of the second face. For example, the video system would identify that the right edge of face C and the top edge of B are one common edge in the omnidirectional image 305, and that the geographical relationship between faces C and B in the projection image 307 requires that face C has to be rotated 90 degrees in order for the right edge of face C to be aligned with the top edge of face B. The video system rearranges or transposes (at step 1030) pixels of the second face (e.g., rotate or flip) according to the identified geographical relationship.

The video system performs (at step 1040) filtering (e.g., deblock filtering) of the pixels of the first face near the first edge and the pixels of the rearranged second face near the second edge. In other words, the video system performs smooth filtering across the common edge by computing a set of filtered pixels based on the pixels of the first face and the pixels of the rearranged second face. The video system rearranges or transposes (at step 1050) the filtered pixels of the second face back to their original positions. The video system then updates (at step 1060) the picture buffer with the filtered pixels of the first face and the second face. The process 1000 then ends.

Figure 11:
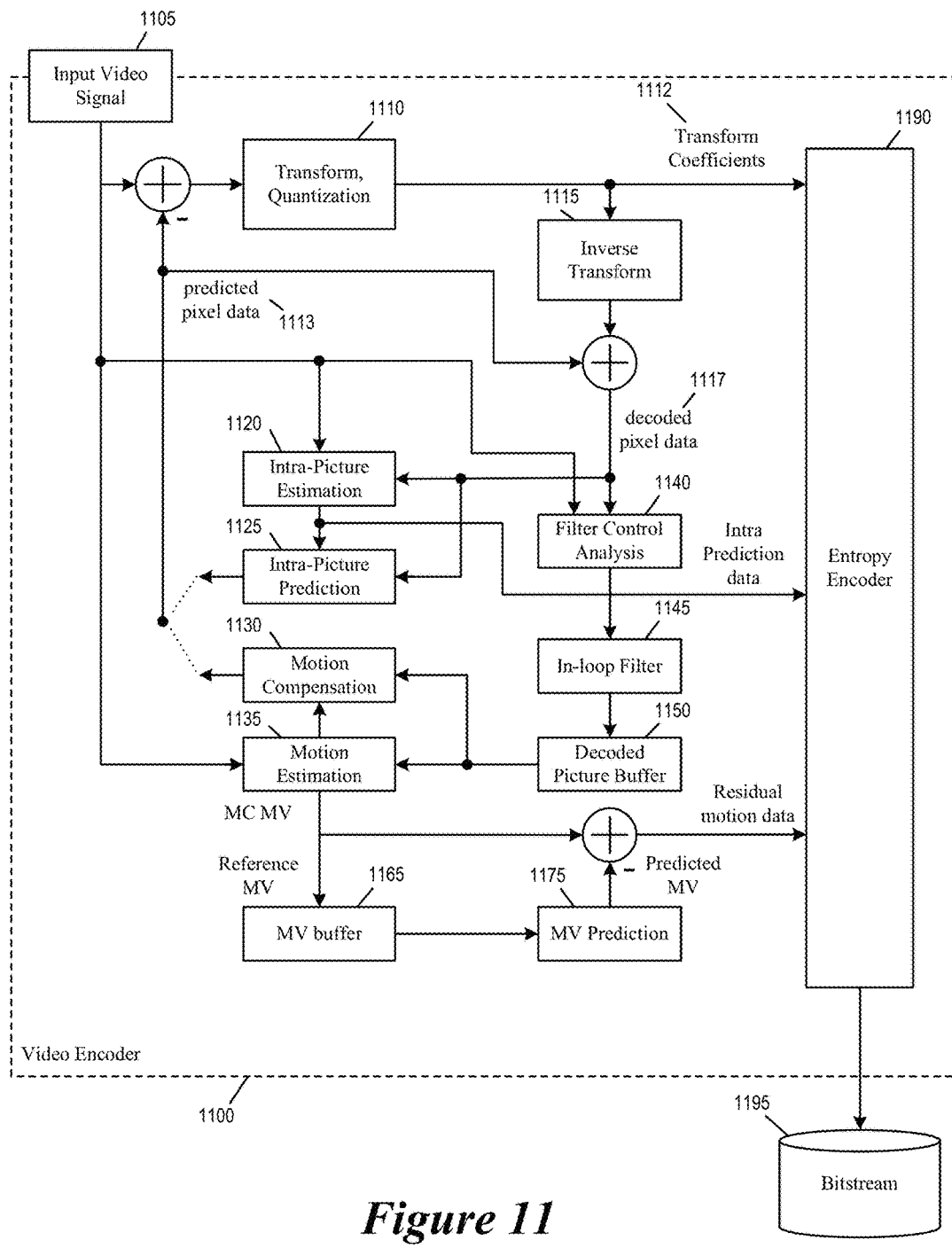
FIG. 11 illustrates a video encoder or video encoding apparatus that implements the 360VR video system.

FIG. 11 illustrates a video encoder 1100 or video encoding apparatus that implements the 360VR video system 500. Specifically, the video encoder performs filtering (e.g., deblock) at edges or borders of projected images of omnidirectional images as part of its in-loop filtering operation.

As illustrated, the video encoder 1100 receives input video signal 1105 and encodes the signal into bitstream 1195. The video encoder 1100 has several components or modules for encoding the video signal 1105, including a transform and quantization module 1110, an inverse transform module 1115, an intra-picture estimation module 1120, an intra-picture prediction module 1125, a motion compensation module 1130, a motion estimation module 1135, a filter control analysis module 1140, an in-loop filter 1145, a decoded picture buffer 1150, a MV buffer 1165, and a MV prediction module 1175, and an entropy encoder 1190.

In some embodiments, the modules 1110-1190 are modules of software instructions being executed by one or more processing units (e.g., a processor) of the computing device 105. In some embodiments, the modules 1110-1190 are modules of hardware circuits implemented by one or more integrated circuits (ICs) of an electronic apparatus. Though the modules 1110-1190 are illustrated as being separate modules, some of the modules can be combined into a single module.

The input video signal 1105 is a raw video signal that presents pixel data of each video frame without compression. In some embodiments, the raw video signal includes a sequence of 360VR projection images provided by a 360VR camera. The transform and quantization module 1110 converts the pixel data of the raw video (minus predicted pixel data 1113 from the intra-prediction module 1125 or the motion compensation module 1130) into quantized transform coefficients 1112 (e.g., from Discrete Cosine Transform, or DCT) to be encoded into the 1195 bitstream by the entropy encoder 1190. The inverse transform module 1115 performs inverse transform on the transform coefficients 1112 and produces decoded pixel data 1117 (after adding prediction pixel data 1113). In some embodiments, the decoded pixel data 1117 is temporarily stored in a line buffer (not illustrated) for intra-picture prediction and spatial MV prediction.

The intra-picture estimation module 1120 performs intra-prediction based on the decoded pixel data 1117 to produce intra prediction data. The intra-prediction data is provided to the entropy encoder 1190 to be encoded into bitstream 1195. The intra-prediction data is also used by the intra-picture prediction module 1125 to produce the predicted pixel data 1113.

The motion estimation module 1135 performs inter-prediction by producing MVs to reference pixel data of previously decoded frames stored in the decoded picture buffer 1150. These MVs are provided to the motion compensation module 1130 to produce predicted pixel data. These MVs are also necessary for reconstructing video frame at the decoder. Instead of encoding the complete actual MVs in the bitstream, the video encoder 1100 uses temporal MV prediction to generate predicted MVs, and the difference between the MVs used for motion compensation and the predicted MVs is encoded as residual motion data and stored in the bitstream 1195 for the decoder.

The video encoder 1100 generates the predicted MVs based on reference MVs that were generated for encoding previously video frames, i.e., the motion compensation MVs that were used to perform motion compensation. The video encoder 1100 retrieves reference MVs from previous video frames from the MV buffer 1165. The video encoder 1100 stores the MVs generated for the current video frame in the MV buffer 1165 as reference MVs for generating predicted MVs.

The MV prediction module 1175 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 1195 by the entropy encoder 1190.

The entropy encoder 1190 encodes various parameters and data into the bitstream 1195 by using entropy encoding techniques such as context-adaptive binary arithmetic coding (CABAC) or Huffman encoding. The entropy encoder 1190 encodes parameters such as quantized transform data and residual motion data into the bitstream.

For some embodiments, the operations of the transform and quantization module 1110, the inverse transform module 1115, the intra-picture estimation module 1120, the intra-picture prediction module 1125, the motion compensation module 1130, and the motion estimation module 1135 correspond to the transform and prediction process 510. The transform and prediction process 510 produces decoded pixels stored in the decoded picture buffer 1150 (which corresponds to the decoded picture buffer 550).

The in-loop filter 1145 performs filtering or smoothing operations to reduce the artifacts of coding, particularly at boundaries of pixel blocks. In some embodiments, the filtering operation performed includes sample adaptive offset (SAO). In some embodiment, the filtering operations include adaptive loop filter (ALF).

The in-loop filter 1145 performs the filtering operations by accessing and updating the pixels stored in the decoded picture buffer 1150. In some embodiments, the in-loop filter 1145 also perform operations to reduce artifacts that arises from the discontinuity at edges of 360VR projection images, such as at border of an equirectangular projection or at common edges between faces of a platonic solid projection. In some of these embodiments, the in-loop filter 1145 performs the functions of the filtering process 530 and the pixel rearranging process 520. In some embodiments, the in-loop filter 1145 also provides temporary buffer (i.e., 560) to temporarily hold rearranged pixels as input to the filtering process 530.

Figure 12:
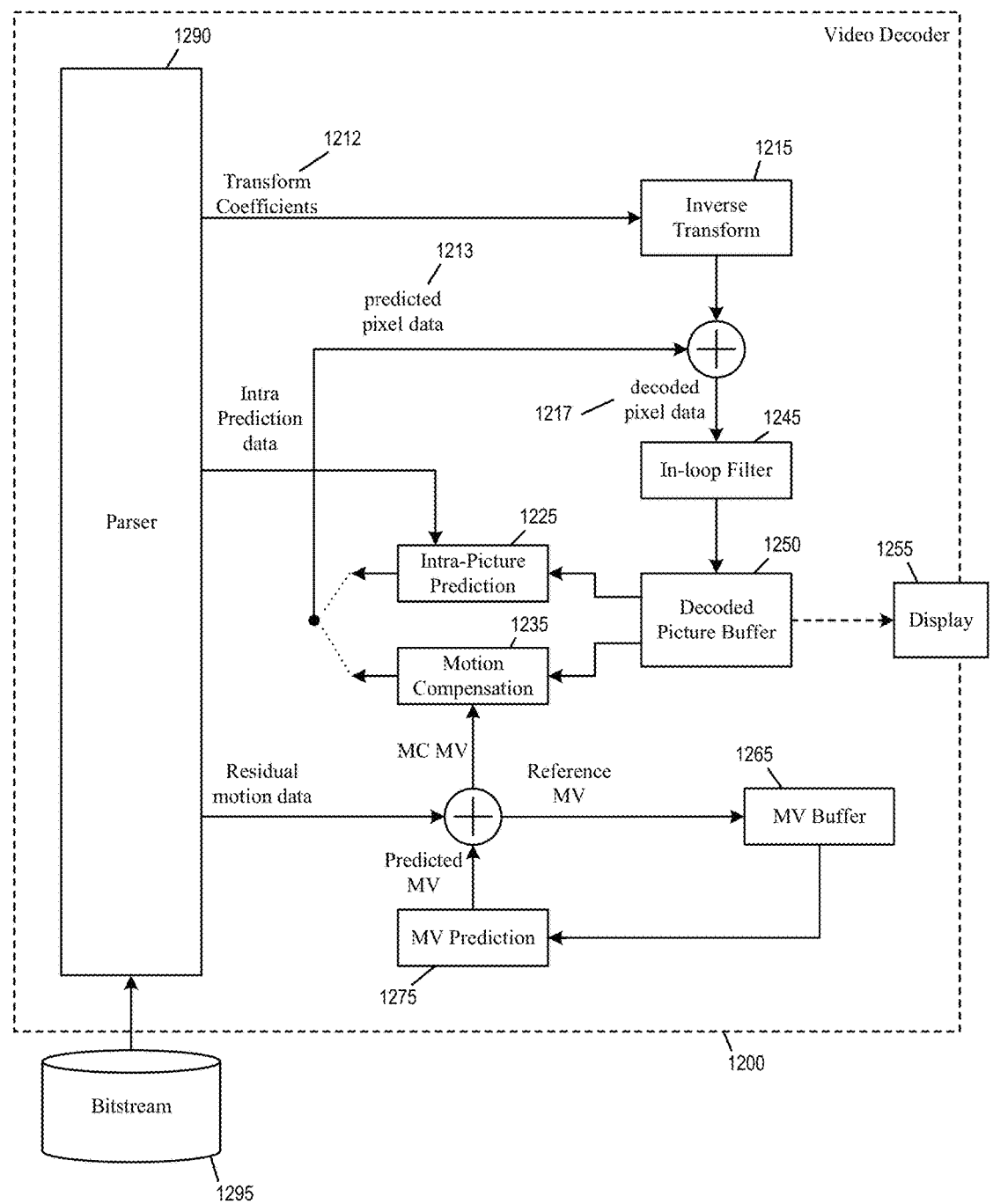
FIG. 12 illustrates a video decoder or a video decoding apparatus that that implements the 360VR video system.

FIG. 12 illustrates a video decoder 1200 or a video decoding apparatus that that implements the 360VR video system 500. Specifically, the video decoder performs filtering (e.g., deblock) at edges or borders of projected images of omnidirectional images as part of its in-loop filtering operation.

As illustrated, the video decoder 1200 receives a bitstream 1295 and decodes the content of the bitstream into pixel data of video frames for display. The video decoder 1200 has several components or modules for decoding the bitstream 1295, including an inverse transform module 1215, an intra-picture prediction module 1225, a motion compensation module 1235, an in-loop filter 1245, a decoded picture buffer 1250, a MV buffer 1265, a MV prediction module 1275, and a bitstream parser 1290.

In some embodiments, the modules 1210-1290 are modules of software instructions being executed by one or more processing units (e.g., a processor) of a computing device. In some embodiments, the modules 1210-1290 are modules of hardware circuits implemented by one or more ICs of an electronic apparatus. Though the modules 1210-1290 are illustrated as being separate modules, some of the modules can be combined into a single module.

The inverse transform module 1215 performs inverse transform on the transform coefficients 1212 and produces decoded pixel data 1217 (after adding predicted pixel data 1213 from the intra-prediction module 1225 or the motion compensation module 1235). The decoded pixel data 1217 is stored in the decoded picture buffer 1250. The intra-picture prediction module 1225 receives intra-prediction data from bitstream 1295 and according to which, produces the predicted pixel data 1213 from the decoded pixel data 1217 stored in the decoded picture buffer 1250. In some embodiments, the decoded pixel data 1217 is also stored in a line buffer (not illustrated) for intra-picture prediction and spatial MV prediction.

In some embodiments, the content of the decoded picture buffer 1250 is used for display. A display device 1255 either retrieves the content of the decoded picture buffer 1250 for display directly, or retrieves the content of the decoded picture buffer to a display buffer. The display device can be a VR display device (e.g., VR goggle) that presents the content of the decoded picture buffer in a VR presentation. In some embodiments, the display device 1255, based on user input, specifies a viewport and displays a portion of the decoded 360VR video based on the viewport.

The motion compensation module 1235 produces predicted pixel data 1213 from the decoded pixel data stored in the decoded picture buffer 1250 according to motion compensation MVs (MC MVs). These motion compensation MVs are reconstructed by adding the residual motion data received from the bitstream 1295 with predicted MVs received from the MV prediction module 1275.

The video decoder 1200 generates the predicted MVs based on reference MVs that were generated for decoding previously video frames, i.e., the motion compensation MVs that were used to perform motion compensation. The video decoder 1200 retrieves the reference MVs of previous video frames from the MV buffer 1265. The video decoder 1200 also stores the motion compensation MVs generated for decoding the current video frame in the MV buffer 1265 as reference MVs for producing predicted MVs.

For some embodiments, the operations of the inverse transform module 1215, the intra-picture prediction module 1225, and the motion compensation module 1235 correspond to the transform and prediction process 510. The transform and prediction process 510 produces decoded pixels stored in the decoded picture buffer 1250 (which corresponds to the decoded picture buffer 550).

The in-loop filter 1245 performs filtering or smoothing operations to reduce the artifacts of coding, particularly at boundaries of pixel blocks. In some embodiments, the filtering operation performed includes sample adaptive offset (SAO). In some embodiment, the filtering operations include adaptive loop filter (ALF).

The in-loop filter 1245 performs the filtering operations by accessing and updating the pixels stored in the decoded picture buffer 1250. In some embodiments, the in-loop filter 1245 also perform operations to reduce artifacts that arises from the discontinuity at edges of 360VR projection images, such as at border of an equirectangular projection or at common edges between faces of a platonic solid projection. In some of these embodiments, the in-loop filter 1245 performs the functions of the filtering process 530 and the pixel rearranging process 520. In some embodiments, the in-loop filter 1245 also provides temporary buffer (i.e., 560) to temporarily hold rearranged pixels as input to the filtering process 530.

Viewport Switching Constraint

Virtual Reality (VR) and 360-degree video imposes enormous demands on codecs and in almost all cases. The most common use case for VR and 360-degree video content consumption is a viewer (e.g., the display device 1255) that is looking at a small window (sometimes called viewport) inside an image that represents data captured from all sides. A viewer could be watching the 360VR video on a smart phone app. Viewer may also be watching this content on a head-mounted display (HMD). The viewport size is usually small (e.g. HD) but the video resolution corresponding to all sides can be significantly more (e.g. 8K).

When 360VR video is displayed on certain terminal, only a fraction of the whole video content will be shown in the viewing window (viewport). Users have the freedom to switch the viewport such that other contents that are previously off the viewport can be put on the viewport when requested. Changing video content contained in the viewport is referred as viewport switching. A viewport can be described in terms of its location (the top left position relative to the origin of 360 video) and its size (width and height).

Viewport switching can be arbitrary. Its location can move from one location to another (any location) in x and/or y directions. Some embodiments of the disclosure provide a video system that imposes constraints on such switching. Specifically, some constraints are imposed on the possible values of delta_X and delta_Y, where delta_X refers to changes in x direction while delta_Y refers to changes in y direction.

In some embodiments, the values of delta_X and delta_Y can be set individually or together. A maximum value in both negative and positive direction is set so that the viewport movement from one time instance to the adjacent time instance cannot be too dramatic, e.g., greater than certain threshold. In some embodiments, delta_X is constrained to be smaller than or equal to MAX_DELTA_WIDTH (both in positive and negative direction), and delta_Y is constrained to be smaller than or equal to MAX_DELTA_HEIGHT (in both positive and negative direction).

In some embodiment, when the viewport switching takes place at both directions at the same time, the sum of the movement, |delta_X|+|delta_Y|, is constrained to be smaller or equal to MAX_DELTA_WIDTH (or MAX_DELTA_HEIGHT). MAX_DELTA_WIDTH or MAX_DELTA_HEIGHT can be related to the width or height of the viewport. In one example, MAX_DELTA_WIDTH is set to be ⅓ of the width; MAX_DELTA_HEIGHT is set to be ⅓ of the height.

In some embodiments, delta_X and delta_Y are constrained when the previous time instance and current time instance are in the same random access point but not when the previous time instance and current time instance are in the different random access point. In other words, when a new random access point is created (such as in a scene change, or a start of a new sequence), the constraints on viewport switching are not imposed.

Figure 13:
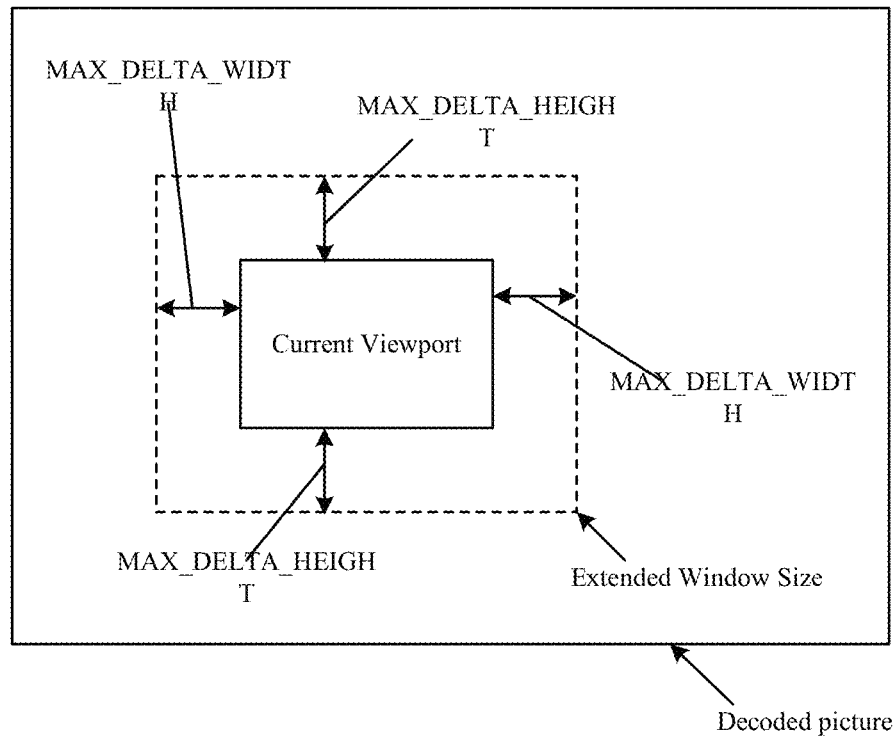
FIG. 13 illustrates maximum video window size based on viewport switching constraints.

In some embodiments, the constraints on viewport switching can be based on each random access point. What the viewport switching constraints actually provide is the maximum possible window size for decoding the video content of one particular random access point. FIG. 13 illustrates maximum video window size based on viewport switching constraints.

As illustrated, starting from the first picture in the random access point, the viewport difference for any other picture in this random access point from the first picture is referred as delta_X and delta_Y, which are constrained by MAX_DELTA_WIDTH and MAX_DELTA_HEIGHT. The maximum video size needed for decoding this random access point is shown as the dotted extended window size.

Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 14:
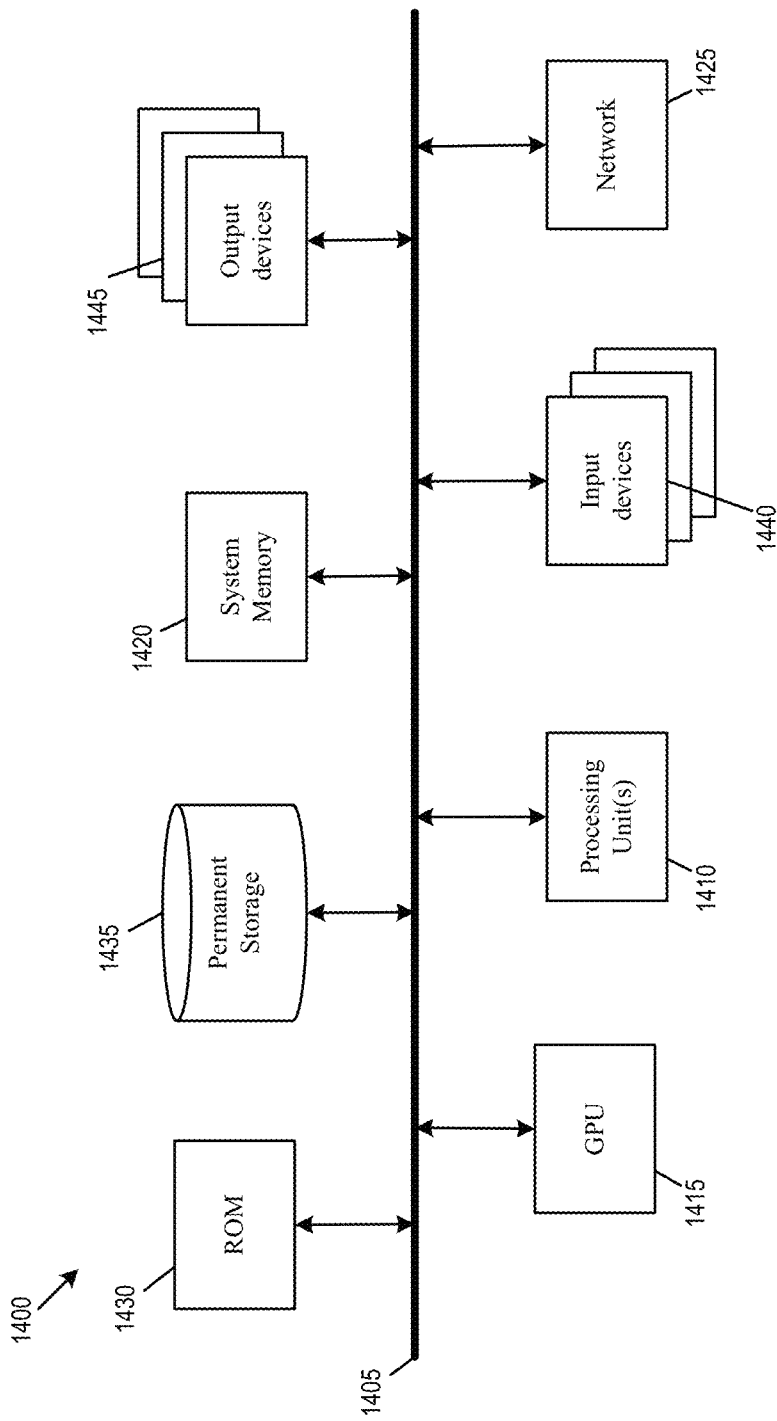
FIG. 14 conceptually illustrates an electronic system in which some embodiments of the present disclosure may be implemented.

FIG. 14 conceptually illustrates an electronic system 1400 with which some embodiments of the present disclosure are implemented. The electronic system 1400 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1400 includes a bus 1405, processing unit(s) 1410, a graphics-processing unit (GPU) 1415, a system memory 1420, a network 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the GPU 1415, the read-only memory 1430, the system memory 1420, and the permanent storage device 1435.

From these various memory units, the processing unit(s) 1410 retrieves instructions to execute and data to process in order to execute the processes of the present disclosure. The processing unit(s) may be a single processor or a multi-core processor in different embodiments. Some instructions are passed to and executed by the GPU 1415. The GPU 1415 can offload various computations or complement the image processing provided by the processing unit(s) 1410.

The read-only-memory (ROM) 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the present disclosure use a mass-storage device (such as a magnetic or optical disk and its corresponding disk drive) as the permanent storage device 1435.

Other embodiments use a removable storage device (such as a floppy disk, flash memory device, etc., and its corresponding disk drive) as the permanent storage device. Like the permanent storage device 1435, the system memory 1420 is a read-and-write memory device. However, unlike storage device 1435, the system memory 1420 is a volatile read-and-write memory, such a random access memory. The system memory 1420 stores some of the instructions and data that the processor needs at runtime. In some embodiments, processes in accordance with the present disclosure are stored in the system memory 1420, the permanent storage device 1435, and/or the read-only memory 1430. For example, the various memory units include instructions for processing multimedia clips in accordance with some embodiments. From these various memory units, the processing unit(s) 1410 retrieves instructions to execute and data to process in order to execute the processes of some embodiments.

The bus 1405 also connects to the input and output devices 1440 and 1445. The input devices 1440 enable the user to communicate information and select commands to the electronic system. The input devices 1440 include alphanumeric keyboards and pointing devices (also called "cursor control devices"), cameras (e.g., webcams), microphones or similar devices for receiving voice commands, etc. The output devices 1445 display images generated by the electronic system or otherwise output data. The output devices 1445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 14, bus 1405 also couples electronic system 1400 to a network 1425 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 9 and 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method comprising:
   receiving a projection image of an omnidirectional image;
   identifying a first edge of the projection image;
   identifying a second edge of the projection image, wherein the first and second edges are physically correlated as a common edge in the omnidirectional image but not physically connected in the projection image; and
   computing a set of filtered pixels based on a first set of pixels near the first edge and a second set of pixels near the second edge,
   wherein the omnidirectional image is a platonic solid having a plurality of faces and the projection image comprises a layout of the faces of the platonic solid, and
   wherein the first edge is an edge of a first face of the platonic solid, the second edge is an edge of a second face of the platonic solid, the first set of pixels is in the first face of the platonic solid, and the second set of pixels is in the second face of the platonic solid.

2. The method of claim 1, wherein said filtering is deblock filtering that reduces discontinuity and compression artifacts across the common edge.

3. The method of claim 1, wherein said filtering comprises rearranging pixels of the second face of the platonic solid according to a geographical relationship between the first face and the second face, the geographical relationship defined by the layout of the faces of the platonic solid in the projection image.

4. The method of claim 3, wherein rearranging pixels of the second face comprises rotating or flipping pixels of the second face based on the geographical relationship between the first face and the second face.

5. The method of claim 3, wherein said filtering further comprises storing the rearranged pixels of the second face at a blank area of the projection image adjacent to the first edge.

6. The method of claim 3, wherein said filtering further comprises storing the rearranged pixels of the second face at a temporary buffer that does not store pixels from a blank area of the projection image.

7. The method of claim 3, wherein said filtering further comprising computing a set of filtered values for the first and second sets of pixels based on the pixels of the first face and the rearranged pixels of the second face.

8. A method comprising:
   receiving a projection image of an omnidirectional image;
   identifying a first edge of the projection image;
   identifying a second edge of the projection image, wherein the first and second edges are physically correlated as a common edge in the omnidirectional image but not physically connected in the projection image; and
   computing a set of filtered pixels based on a first set of pixels near the first edge and a second set of pixels near the second edge,
   wherein the omnidirectional image is a sphere and the projection image comprises an equirectangular projection of the sphere, and
   wherein both the first edge and the second edge extend from a north pole to a south pole of the sphere.

9. An electronic apparatus comprising:
   a decoded picture storage capable of receiving and storing a projection image of an omnidirectional image; and
   a filtering circuit capable of:
   identifying a first edge of the projection image;
   identifying a second edge of the projection image, wherein the first and second edges are physically correlated as a common edge in the omnidirectional image but not physically connected in the projection image; and
   computing a set of filtered pixels based on a first set of pixels near the first edge and a second set of pixels near the second edge,
   wherein the omnidirectional image is a platonic solid having a plurality of faces and the projection image comprises a layout of the faces of the platonic solid, and
   wherein the first edge is an edge of a first face of the platonic solid, the second edge is an edge of a second face of the platonic solid, the first set of pixels is in the first face of the platonic solid, and the second set of pixels is in the second face of the platonic solid.

10. The electronic apparatus of claim 9, wherein said filtering is deblock filtering that reduces discontinuity and compression artifacts across the common edge.

11. The electronic apparatus of claim 9 further comprising a rearranging circuit capable of rearranging pixels of the second face of the platonic solid according to a geographical relationship between the first face and the second face, the geographical relationship defined by the layout of the faces of the platonic solid in the projection image.

12. The electronic apparatus of claim 11, wherein rearranging pixels of the second face comprises rotating or flipping pixels of the second face based on the geographical relationship between the first face and the second face.

13. The electronic apparatus of claim 11, wherein said rearranged pixels of the second face are stored at a blank area of the projection image adjacent to the first edge.

14. The electronic apparatus of claim 11, wherein said rearranged pixels of the second face are stored at a temporary buffer that does not store pixels from a blank area of the projection image.

15. The electronic apparatus of claim 11, wherein the filtering circuit computes a set of filtered values for the first and second sets of pixels based on the pixels of the first face and the rearranged pixels of the second face.

16. The electronic apparatus of claim 9, wherein the omnidirectional image is a sphere and the projection image comprises an equirectangular projection of the sphere.

17. The electronic apparatus of claim 15, wherein both the first edge and the second edge extend from the north pole to the south pole of the sphere.

* * * * *